Figure 1:
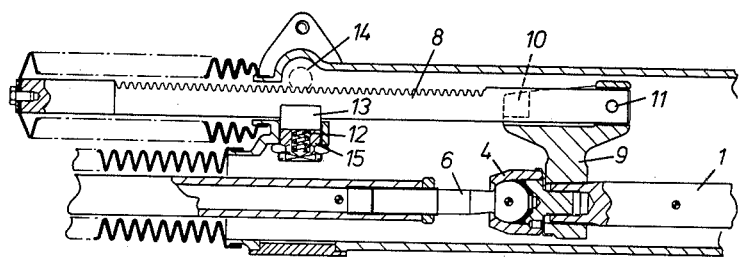

United States Patent [19]
Millard

[11] 4,172,507
[45] Oct. 30, 1979

[54] POWER-ASSISTED RACK-AND-PINION STEERING MECHANISMS

[75] Inventor: Barry J. Millard, Reading, England

[73] Assignee: Adwest Engineering Limited, England

[21] Appl. No.: 883,922

[22] Filed: Mar. 6, 1978

[30] Foreign Application Priority Data

Mar. 9, 1977 [GB] United Kingdom ............... 09831/77

[51] Int. Cl.² ............................................. B62D 3/12
[52] U.S. Cl. ................................................. 180/148
[58] Field of Search ............... 180/148, 151, 154, 155, 180/156, 157, 158, 159, 160; 74/388 PS, 498, 422; 280/96; 91/382

[56] References Cited

U.S. PATENT DOCUMENTS

| | | | |
|---|---|---|---|
| 2,865,339 | 12/1958 | Bishop | 91/382 |
| 3,944,015 | 3/1976 | Bishop | 180/148 |

*Primary Examiner*—Joseph F. Peters, Jr.
*Assistant Examiner*—R. Schrecengost

*Attorney, Agent, or Firm*—Charles W. Helzer

[57] ABSTRACT

A power-assisted rack-and-pinion steering mechanism for a vehicle provided with a beam axle and semi-elliptical springs, the steering mechanism comprising double-acting piston-and-cylinder means having a piston rod opposite ends of which are provided with ball joints whereby the piston rod is connectable with the steerable road wheels of a vehicle, a toothed rack spaced radially of the piston rod and extending away from the piston rod beyond one end thereof, a pinion connectable with the steering control of a vehicle and in meshing engagement with the toothed rack, the pinion being located outside, not between, said ball joints, a connecting member connecting adjacent ends of the piston rod and toothed rack, the connecting member being rigidly connected to the piston rod and being pivotally connected to the toothed rack, and a bifurcation of said connecting member for restraining the toothed rack against pivotal movement about an axis normal to the axis of said pivotal connection.

7 Claims, 2 Drawing Figures

POWER-ASSISTED RACK-AND-PINION STEERING MECHANISMS

The present invention relates to power-assisted rack-and-pinion steering mechanisms.

Whilst power-assisted rack-and-pinion steering mechanisms are now widely used on light road vehicles such as motor cars, they have not yet been adopted for use on the larger commercial vehicles such as trucks and lorries because of the packaging problems created mainly by the type of front suspension used on such larger commercial vehicles. Thus, the front suspension of the larger commercial vehicles such as trucks and lorries still generally comprises a beam axle and semi-elliptical springs whilst the steering wheel and steering column are generally at the extreme front of the vehicle, forward of the beam axle, with the steering column extending down on one side of the vehicle outside the semi-elliptical springs. If a conventional power-assisted rack-and-pinion steering mechanism is to be fitted to such a vehicle so that it extends transversely thereof then it should preferably be fitted behind the beam axle so that it is protected thereby. However this creates problems in connecting the output of the steering column to the input of the steering mechanism since one is in front of the beam axle and outside the semi-elliptical springs whilst the other is behind the beam axle and between the semi-elliptical springs. Fitting the steering mechanism to the vehicle so that it extends longitudinally of the vehicle also creates problems since the ends of the movable rack of the steering mechanism cannot then be connected directly to the steerable road wheels of the vehicle, as is the case when the steering mechanism is fitted transversely, and because of its length and the fact that it has to be securely mounted, the steering mechanism can only be fitted behind the beam axle and between the semi-elliptical springs.

The present invention has as its object to provide a power-assisted rack-and-pinion steering mechanism suitable for fitting to a commercial vehicle having a beam axle and semi-elliptical spring front suspension.

The present invention provides a power-assisted rack-and pinion steering mechanism comprising double-acting piston-and-cylinder means including a piston rod opposite ends of which are connectable to the steerable road wheels of a vehicle, a toothed rack spaced radially of the piston rod, one end of the toothed rack being adjacent one end of the piston rod and the other end of the toothed rack extending away from the piston rod beyond said one end of the piston rod, a pinion connectable with the steering control of a vehicle and in meshing engagement with the toothed rack, means urging the toothed rack into meshing engagement with the pinion, a connecting member rigidly connected to said one end of the piston rod and extending radially outwards therefrom, means pivotally connecting said one end of the toothed rack to the connecting member whereby the toothed rack can pivot into meshing engagement with the pinion, and means restraining the toothed rack against pivotal movement about an axis normal to the axis of said pivotal connection so as to prevent binding between the teeth of the pinion and the teeth of the toothed rack.

Said restraining means preferably comprises a bifurcation on said connecting member which closely embraces the toothed rack at said one end thereof, said bifurcation extending over a sufficient axial length of the toothed rack so as to prevent any pivotal movement of the toothed rack about an axis normal to the axis of said pivotal connection. Thus said bifurcation may extend over an axial length of the toothed rack equivalent to at least twice, and preferably at least three times, the diameter of the toothed rack where the toothed rack is formed from round bar stock.

Figure 2:
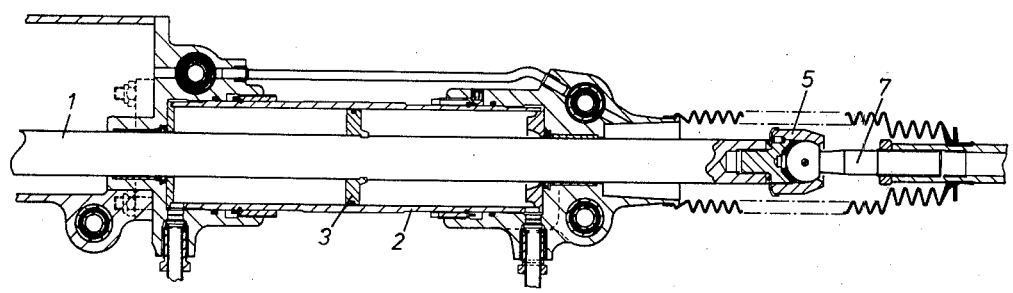

The invention will be further described with reference to the accompanying drawings, in which FIGS. 1 and 2 show in sectional elevation opposite end portions of a power-assisted rack-and-pinion steering mechanism according to the present invention.

Referring to the drawings it will be seen that the steering mechanism illustrated comprises a piston rod 1 which extends through, and from opposite ends of, a cylinder 2, a double-acting piston 3 being mounted on the piston rod 1. Opposite ends of the piston rod 1 are connected by way of ball joints 4 and 5 to steering links 6 and 7 whereby the piston rod is connectable to the steerable road wheels of a vehicle. A toothed rack 8 formed from round bar stock is spaced radially of the piston rod 1 and is connected to the piston rod 1 by a connecting member 9. The connecting member 9 is rigidly secured to the piston rod 1 adjacent the ball joint 4 and extends radially outwards of the piston rod 1. At its outer end the connecting member is bifurcated as shown at 10 so as to closely embrace the adjacent end portion of the toothed rack 8. The bifurcation 10 extends over an axial length of the toothed rack 8 equivalent to at least twice, and preferably, as shown, at least three times, the diameter of the toothed rack 8. The toothed rack 8 is pivotally connected to the connecting member by means of a pivot pin 11. Thus the toothed rack can pivot about the pivot pin 11 but is restrained by the embracing connecting member 9 from pivotal movement about an axis normal to the axis of pivot pin 11. The toothed rack 8 is urged by a spring 12 and bearing pad 13 into meshing engagement with a pinion 14.

Although not shown in the drawings, the pinion 14 is connectable in conventional manner to the steering control of a vehicle by way of a conventional rotary control valve adapted to direct fluid under pressure from a suitable source, such as an engine driven pump, to the cylinder 2 on one side or the other of the double-acting piston 3 to provide the power-assistance.

In the illustrated embodiment the toothed rack 8 is shown as being substantially parallel to the piston rod 1. However, if desired, the radial extent of the connecting member 9 could be reduced so that the end of the toothed rack which is connected to the piston rod 1 is moved nearer the piston rod 1 and so that the toothed rack extends both outwardly of and at an angle to the piston rod 1. In such a case the contacting surfaces between the bearing pad 13 and its backing ring 15 would need to be arcuate so that the bearing pad 13 will remain in proper bearing contact with the toothed rack as the toothed rack moves longitudinally.

It will be appreciated by those skilled in the art that in the described embodiment the toothed rack 8 and the pinion 14 are outside the ball joints 4 and 5 and not between them as in a conventional power-assisted rack-and-pinion steering mechanism. This not only enables the distance between the centres of the ball joints 4 and 5 to be kept to a minimum, which is desirable, but also suits the steering mechanism for use on a commercial vehicle having a front suspension comprising a beam axle and semi-elliptical springs since the steering mechanism can be mounted transversely of the vehicle, behind the beam axle with the input of the steering mechanism outside the semi-elliptical springs and aligned longitudinally of the vehicle with the output of the steering control, e.g., a bevel output at the lower end of a steering column of the vehicle.

It will also be appreciated that by offsetting the toothed rack 8 from the piston rod 1 a pivot force is created around the piston rod. To control this the toothed rack should, ideally, be rigidly connected to the piston rod. However, a rigid connection would prevent adjustment of the toothed rack into meshing engagement with the pinion. This problem is overcome by the bifurcated connecting member 9 and the pivotal connection provided by pivot pin 11 since the toothed rack 8 can pivot into meshing engagement with the pinion 14 but is restrained by the connecting member 9 from pivotal movement about an axis normal to the axis of pivot pin 11.

What is claimed is:

1. A power-assisted rack-and-pinion steering mechanism comprising double-acting piston-and-cylinder means including a piston rod opposite ends of which are connectable to the steerable road wheels of a vehicle, a toothed rack spaced radially of the piston rod, one end of the toothed rack being adjacent one end of the piston rod and the other end of the toothed rack extending away from the piston rod beyond said one end of the piston rod, a pinion connectable with the steering control of a vehicle and in meshing engagement with the toothed rack, means urging the toothed rack into meshing engagement with the pinion, a connecting member rigidly connected to said one end of the piston rod and extending radially outwards therefrom, means pivotally connecting said one end of the toothed rack to the connecting member whereby the toothed rack can pivot about an axis normal to a plane containing the longitudinal axes of both the toothed rack and the piston rod into meshing engagement with the pinion, and means restraining the toothed rack against pivotal movement about an axis normal to the axis of said pivotal connection so as to prevent binding between the teeth of the pinion and the teeth of the toothed rack.

2. A steering mechanism according to claim 1, wherein said restraining means comprises a bifurcation on said connecting member which closely embraces the toothed rack at said one end thereof, said bifurcation extending over a sufficient axial length of the toothed rack as to prevent any pivotal movement thereof about an axis normal to the axis of said pivotal connection.

3. A steering mechanism according to claim 2, wherein said bifurcation extends over an axial length of the toothed rack equivalent to not less than twice the diameter of the toothed rack.

4. A steering mechanism according to claim 1, wherein the toothed rack is substantially parallel to the piston rod.

5. A steering mechanism according to claim 1, wherein the toothed rack is inclined with respect to the piston rod.

6. A steering mechanism according to claim 1, wherein the piston rod has a ball-and-socket joint at each end thereof whereby it is connectable with the steerable road wheels of a vehicle, and wherein said pinion is located outside, not between, said ball-and-socket joints.

7. A steering mechanism according to claim 2, wherein said bifurcation extends over an axial length of the toothed rack equivalent to not less than three times the diameter of the toothed rack.

* * * * *